No. 732,147. PATENTED JUNE 30, 1903.
M. WEISSER.
TELEPHONE TRANSMITTER.
APPLICATION FILED JAN. 11, 1902.
NO MODEL.
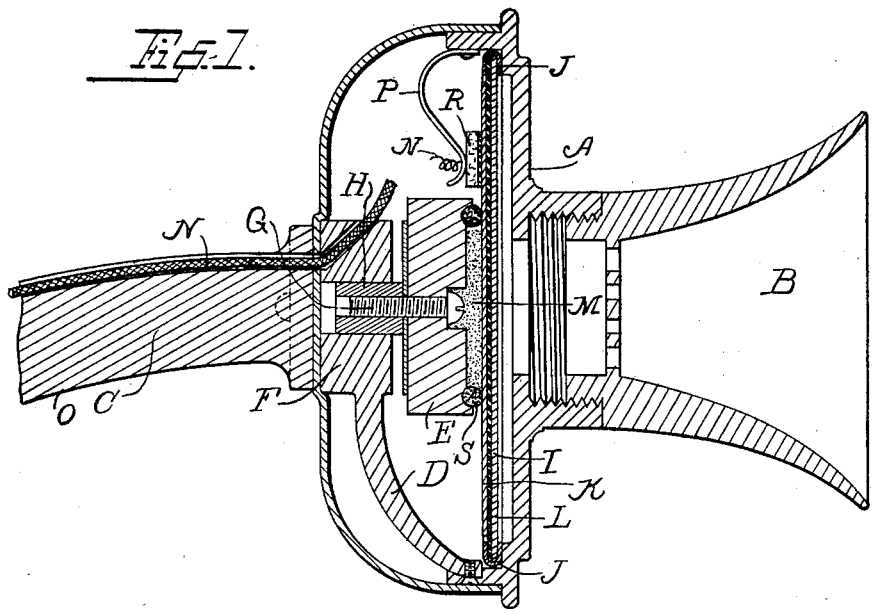
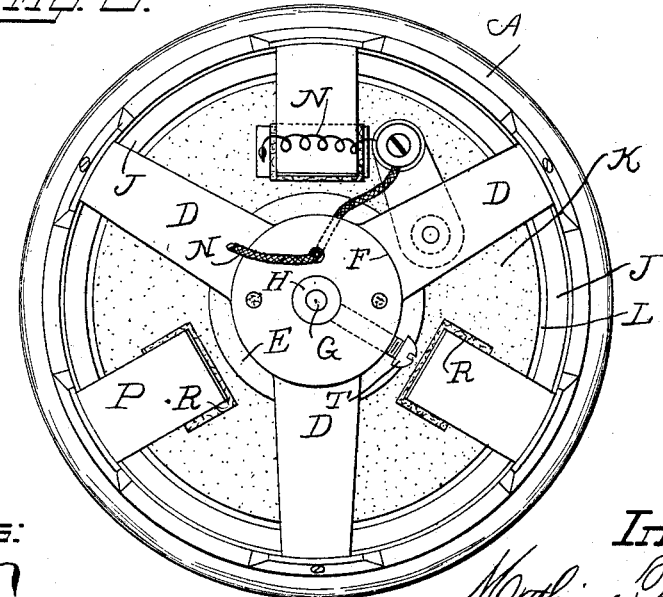
Witnesses:
F. A. Otto
C. L. Roesch
Inventor
Mathias Weisser
Enorie & Wheeler
Attorneys.

No. 732,147. Patented June 30, 1903.

UNITED STATES PATENT OFFICE.

MATHIAS WEISSER, OF MILWAUKEE, WISCONSIN.

TELEPHONE-TRANSMITTER.

SPECIFICATION forming part of Letters Patent No. 732,147, dated June 30, 1903

Application filed January 11, 1902. Serial No. 89,253. (No model.)

*To all whom it may concern:*

Be it known that I, MATHIAS WEISSER, a citizen of the United States, residing at Milwaukee, county of Milwaukee, and State of Wisconsin, have invented new and useful Improvements in Telephone-Transmitters, of which the following is a specification.

My invention relates to improvements in telephone-transmitters.

In telephone-transmitters as herefore constructed the electric circuit between the transmitter and the receiver is formed through the metallic diaphragm. Owing to the fact that the metallic diaphragm is uncovered and exposed to direct contact with the breath of the user and the humidity of the atmosphere, it corrodes and accumulates dust and foreign matter, whereby the passage of the electric circuit through it is more or less impeded and the action of the transmitter is injuriously affected. By my present improvements the metallic diaphragm is entirely insulated from the electric circuit and the passage of the electric current is consequently unaffected by the conditions of the metallic diaphragm in the respects named, while owing to the fact that the metallic diaphragm is insulated, cushioned by rubber or other nonmetallic substances, the sharp unpleasant sounds heretofore produced by contact of two moving metallic surfaces are avoided and the voice of the user as reproduced is consequently fuller and more natural.

My invention is further explained by reference to the accompanying drawings, in which—

Figure 1 represents a central vertical section, and Fig. 2 represents a rear view with the shell removed.

Like parts are identified by the same reference-letters in both views.

The body A, mouthpiece B, the supporting-arm C, the spider or bracket D, by which the body A is supported from said arm C, the carbon block E, as adjustably supported from the hub F of the bracket by the screw G, and sleeve H have all been previously used in various combinations in the construction of a telephone-transmitter and are not broadly claimed in this application.

The present invention pertains more especially to the manner of insulating the metallic diaphragm I at its periphery from the retaining-bearings of the body A by the annular collar or packing-ring J, formed of any suitable insulating material, and also to the manner of insulating said diaphragm from the carbon diaphragm K by an insulating-disk L, which is located between said metallic diaphragm I and said carbon disk, and it also further pertains to the manner of forming the electric circuit between the two wires leading from the telephone-receiver, as shown, through the carbon diaphragm K and granulated carbon packing M and the other electric connections forming the circuit without being brought into electrical connection with said metallic diaphragm, whereby the metallic sound heretofore caused by the direct contact of the metallic bearing against the moving metallic diaphragm is avoided. To accomplish this object, it becomes necessary simply to insulate said metallic diaphragm at its periphery and center, as stated, and connect one branch N of said electric circuit with said carbon disk K and the other branch O of said electric circuit with any metallic part of the transmitter which is electrically connected with the supporting-bearings of the carbon block E, whereby the electric circuit will be formed through said carbon diaphragm and granulated carbon and said carbon block. The branch N of the electric circuit is held in contact with the carbon diaphragm by one of the elastic arms P, three of said arms P being employed to hold said carbon diaphragm K in place, which arm is insulated from said branch by a yielding packing R.

It will be understood that the granulated carbon M is retained in place between the carbon diaphragm K and the carbon block E by a yielding cushion S, which is formed of felt or any similar soft material. It will also be understood that said cushion and granulated carbon are adjusted to bear with greater or less pressure against said carbon disk by the adjustment of the sleeve H in the hub F. To accomplish this object, the set-screw T is released from contact with said adjustable sleeve H when said sleeve is moved toward the right or left in its bearings until the desired adjustment is attained, when said set-screw is turned down against said sleeve, whereby said parts are retained at the desired point of adjustment.

Having thus described my invention, what I claim as new, and desire to secure by Letters Patent, is—

1. In the class of telephone-transmitters herein described, the combination of a metallic diaphragm; a supporting-bearing therefor; a carbon block; an intermediate packing of granulated carbon; a carbon disk; and a packing insulating said metallic diaphragm from its supporting-bearings and said carbon disk and granulated packing, as set forth.

2. A telephone-transmitter, comprising a supporting-arm; a bracket supported from said arm; a body portion and mouthpiece supported from the arms of said bracket; a carbon block and a granulated-carbon packing centrally supported from the hub of said bracket; a metallic diaphragm having insulating-bearings in said body portion; an insulating-disk located against the rear surface of said metallic diaphragm; and a carbon diaphragm interposed between said insulating-disk and said packing of granulated carbon, substantially as and for the purpose specified.

3. A telephone-transmitter, comprising a supporting-arm; a bracket supported from said arm; a body portion and mouthpiece supported from the arms of said bracket; a carbon block and a granulated-carbon packing centrally supported from the hub of said bracket; a metallic diaphragm having insulating-bearings in said body portion; an insulating-disk located against the rear surface of said metallic diaphragm; a carbon diaphragm interposed between said insulating-disk and said packing of granulated carbon; an electric circuit having one of its branches electrically connected with said carbon diaphragm, and its other arm electrically connected with the supporting-bearings of the carbon block, whereby the electric circuit is formed through said transmitter without passing through said metallic diaphragm, as set forth.

In testimony whereof I affix my signature in the presence of two witnesses.

MATHIAS WEISSER.

Witnesses:
JAS. B. ERWIN,
C. L. ROESCH.